US008077801B2

(12) United States Patent
Malladi

(10) Patent No.: US 8,077,801 B2
(45) Date of Patent: Dec. 13, 2011

(54) PILOT STRUCTURE WITH MULTIPLEXED UNICAST AND SFN TRANSMISSIONS

(75) Inventor: Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 908 days.

(21) Appl. No.: 11/971,801

(22) Filed: Jan. 9, 2008

(65) Prior Publication Data

US 2008/0267317 A1 Oct. 30, 2008

Related U.S. Application Data

(60) Provisional application No. 60/884,404, filed on Jan. 10, 2007, provisional application No. 60/888,485, filed on Feb. 6, 2007.

(51) Int. Cl.
*H04L 27/00* (2006.01)

(52) U.S. Cl. ........ 375/299; 375/295; 375/260; 370/335; 370/390; 370/401

(58) Field of Classification Search .................. 375/299, 375/295, 260; 370/335, 390, 401
See application file for complete search history.

(56) References Cited

U.S. PATENT DOCUMENTS

| | | | | |
|---|---|---|---|---|
| 5,852,630 A | * | 12/1998 | Langberg et al. | 375/219 |
| 6,144,695 A | * | 11/2000 | Helms et al. | 375/222 |
| 7,778,149 B1 | * | 8/2010 | McGrath et al. | 370/208 |
| 2006/0067206 A1 | * | 3/2006 | Mantravadi et al. | 370/208 |
| 2006/0176966 A1 | | 8/2006 | Stewart et al. | |
| 2007/0104151 A1 | * | 5/2007 | Papasakellariou et al. | 370/335 |
| 2008/0032744 A1 | * | 2/2008 | Khan et al. | 455/562.1 |
| 2008/0267317 A1 | | 10/2008 | Malladi | |

FOREIGN PATENT DOCUMENTS

| | | |
|---|---|---|
| EP | 1734684 | 12/2006 |
| RU | 2139636 C1 | 10/1999 |
| WO | 2005122517 | 12/2005 |
| WO | 2006036759 | 4/2006 |
| WO | 2006109134 | 10/2006 |

OTHER PUBLICATIONS

International Search Report—PCT/US08/050724—International Search Authority, European Patent Office—Oct. 13, 2008.
Written Opinion—PCT/US08/050724—International Search Authority, European Patent Office—Oct. 13, 2008.

* cited by examiner

*Primary Examiner* — Chieh M Fan
*Assistant Examiner* — Siu Lee
(74) *Attorney, Agent, or Firm* — Jonathan Velasco; Liem T. Do

(57) ABSTRACT

Systems and methodologies are described that facilitate multiplexing unicast reference symbols and multicast transmissions in the same transmission time interval. In particular, mechanisms are provided that enable multiplexing unicast reference symbols to single frequency network transmissions that utilize a longer cyclic prefix duration. Unicast reference symbols are sent in a first symbol of a slot containing both unicast and single frequency network transmissions. The frequency utilized for the unicast reference symbols is staggered between the first symbol and a subsequent symbol in a subframe.

14 Claims, 15 Drawing Sheets

PILOT STRUCTURE WITH MULTIPLEXED UNICAST AND SFN TRANSMISSIONS

CROSS-REFERENCE TO RELATED APPLICATIONS

This application claims the benefit of U.S. Provisional Patent application Ser. No. 60/884,404 entitled "A METHOD AND APPARATUS FOR USING A PILOT STRUCTURE WITH MULTIPLEXED UNICAST AND SFN TRANSMISSIONS" which was filed Jan. 10, 2007. This application also claims the benefit of U.S. Provisional Patent application Ser. No. 60/888,485 entitled "A METHOD AND APPARATUS FOR USING A PILOT STRUCTURE WITH MULTIPLEXED UNICAST AND SFN TRANSMISSIONS" which was filed on Feb. 6, 2007. The entireties of the aforementioned applications are herein incorporated by reference.

BACKGROUND

I. Field

The following description relates generally to communications systems and more particularly to providing a pilot structure in multiplexed unicast and single frequency network transmissions.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, ... ). Examples of such multiple-access systems may include code division multiple access (CDMA) systems, time division multiple access (TDMA) systems, frequency division multiple access (FDMA) systems, orthogonal frequency division multiple access (OFDMA) systems, and the like.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth.

MIMO systems commonly employ multiple ($N_T$) transmit antennas and multiple ($N_R$) receive antennas for data transmission. A MIMO channel formed by the $N_T$ transmit and $N_R$ receive antennas may be decomposed into Ns independent channels, which may be referred to as spatial channels, where $N_S \leq \{N_T, N_R\}$. Each of the $N_S$ independent channels corresponds to a dimension. Moreover, MIMO systems may provide improved performance (e.g., increased spectral efficiency, higher throughput and/or greater reliability) if the additional dimensionalities created by the multiple transmit and received antennas are utilized.

MIMO systems may support various duplexing techniques to divide forward and reverse link communications over a common physical medium. For instance, frequency division duplex (FDD) systems may utilize disparate frequency regions for forward and reverse link communications. Further, in time division duplex (TDD) systems, forward and reverse link communications may employ a common frequency region. However, conventional techniques may provide limited or no feedback related to channel information.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to an aspect, a method for transmitting a pilot signal with multiplexed unicast and multicast transmissions herein. The method can comprise classifying one or more modes of transmission. In addition, the method can include selecting a cyclic prefix duration for at least one sub-frame in accordance with the classified one or more modes. The method can also comprise multiplexing pilot information and user data in the at least one sub-frame based at least in part on the selected cyclic prefix duration.

Another aspect relates to a wireless communications apparatus that comprises a memory that retains instructions related to classifying one or more modes of transmission, selecting a longer cyclic prefix duration for at least one sub-frame in accordance with the classified one or more modes and multiplexing pilot information and user data in the at least one sub-frame based at least in part on the longer cyclic prefix duration. The wireless communications apparatus can also include a processor coupled to the memory, configured to execute the instructions retained in the memory.

Yet another aspect relates to a wireless communications apparatus that facilitates transmitting a pilot signal multiplexed with multicast transmissions. The apparatus can include means for classifying one or more modes of transmission. In addition, the apparatus can include means for selecting a longer cyclic prefix duration for at least one sub-frame in accordance with the classified one or more modes. The apparatus can further comprise means for multiplexing pilot information and user data in the at least one sub-frame based at least in part on the longer cyclic prefix duration.

Still another aspect relates to a machine-readable medium having stored thereon machine-executable instructions for classifying one or more modes of transmission. The machine-readable medium can further comprise instructions for selecting a longer cyclic prefix duration for at least one sub-frame in accordance with the classified one or more modes. In addition, the machine-readable medium can include instructions for multiplexing pilot information and user data in the at least one sub-frame based at least in part on the longer cyclic prefix duration.

According to another aspect, in a wireless communications system, an apparatus can comprise an integrated circuit. The integrated circuit can be configured to classify one or more modes of transmission. The integrated circuit can further be configured to select a longer cyclic prefix duration for at least one sub-frame in accordance with the classified one or more modes. In addition, the integrated circuit can be configured to multiplex pilot information and user data in the at least one sub-frame based at least in part on the longer cyclic prefix duration.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
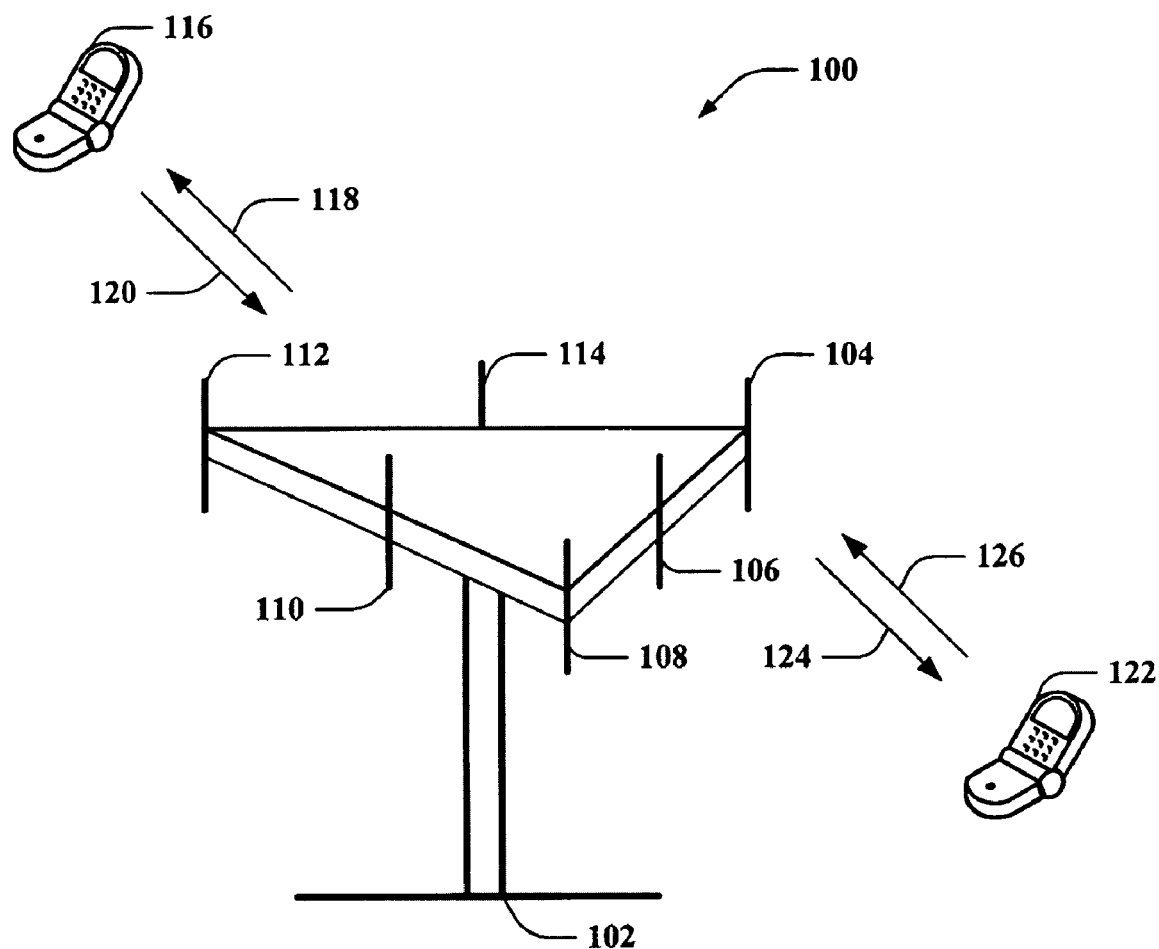
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device may be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station may be utilized for communicating with mobile device(s) and may also be referred to as an access point, Node B, or some other terminology.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that may include multiple antenna groups. For example, one antenna group may include antennas 104 and 106, another group may comprise antennas 108 and 110, and an additional group may include antennas 112 and 114. Two antennas are illustrated for each antenna group; however, more or fewer antennas may be utilized for each group. Base station 102 may additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 may communicate with one or more mobile devices such as mobile device 116 and mobile device 122; however, it is to be appreciated that base station 102 may communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 may utilize a different frequency band than that used by reverse link 120, and forward link 124 may employ a different frequency band than that employed by reverse link 126, for example. Further, in a time division duplex (TDD) system, forward link 118 and reverse link 120 may utilize a common frequency band and forward link 124 and reverse link 126 may utilize a common frequency band.

The set of antennas and/or the area in which they are designated to communicate may be referred to as a sector of base station 102. For example, multiple antennas may be designed to communicate to mobile devices in a sector of the areas covered by base station 102. In communication over forward links 118 and 124, the transmitting antennas of base station 102 may utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells may be subject to less interference as compared to a base station transmitting through a single antenna to all its mobile devices.

According to an example, system 100 may be a multiple-input multiple-output (MIMO) communication system. Further, system 100 may utilize any type of duplexing such as FDD, TDD, etc. Pursuant to an illustration, base station 102 may transmit over forward links 118 and 124 to mobile devices 116 and 122. Moreover, mobile devices 116 and 122 may estimate respective forward link or downlink channels and generate corresponding feedback that may be provided to base station 102 via reverse links or uplinks 120 and 126.

Figure 2:
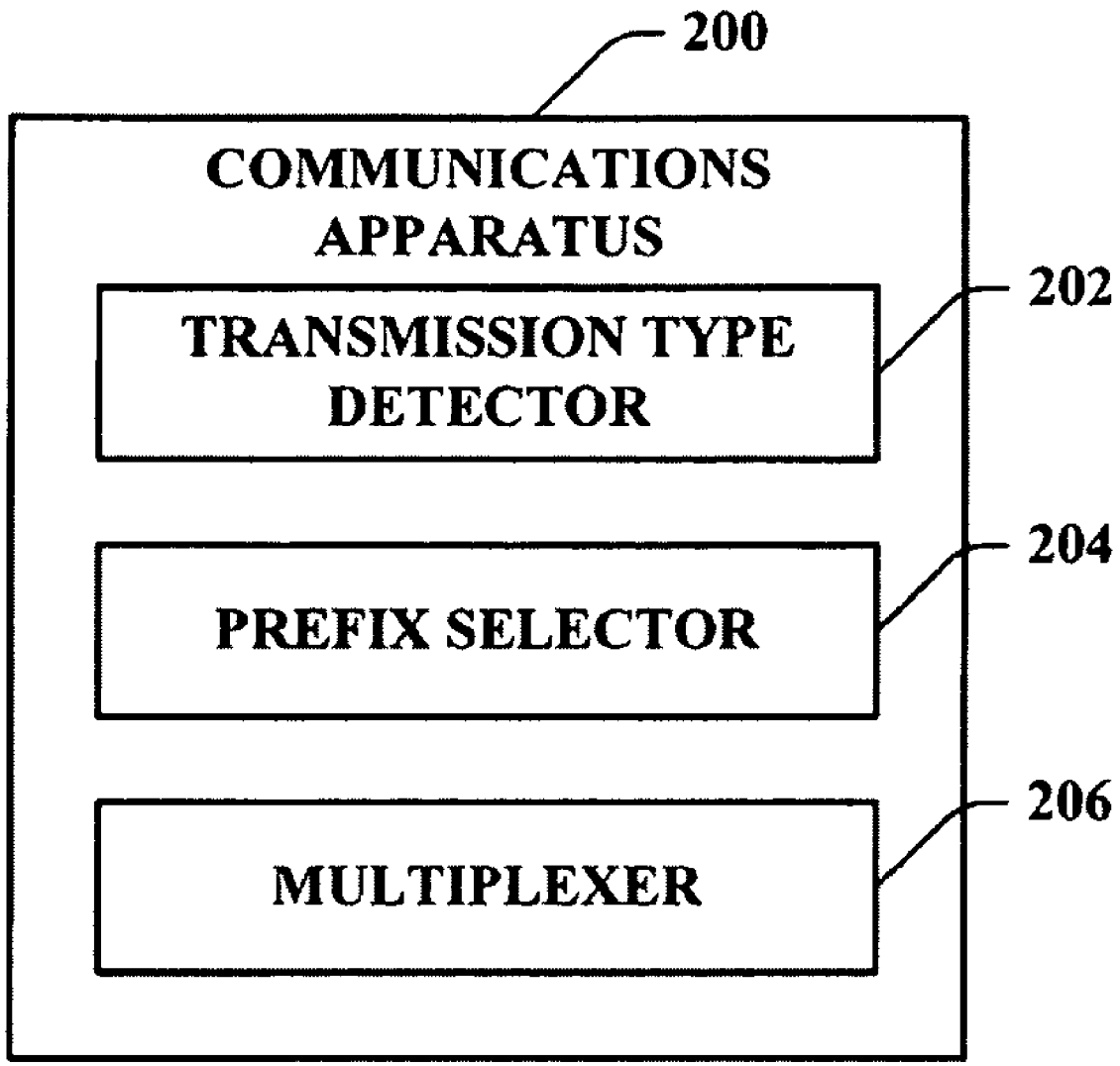
FIG. 2 is an illustration of an example communications apparatus for employment in a wireless communications system according to an aspect of the subject disclosure.

Turning now to FIG. 2, illustrated is a communications apparatus 200 for employment in a wireless communications environment. Communications apparatus 200 can be a base station or a portion thereof. In addition, communications apparatus 200 can be a mobile device or a portion thereof. Communications apparatus 200 can send and received data transmission to and from other communications apparatus, base stations, mobile devices, etc. For example, communications apparatus 200 can include receiver and/or transmitter systems configured to communication in a wireless communications system. Communications apparatus 200 can employ wireless communication techniques such as, but not limited to, OFDMA, CDMA, TDMA, FDMA and the like. Communications apparatus 200 includes a transmission type detector 202 that determines a type of transmission to be employed. The transmission can be a single frequency network (SFN) transmission (e.g. simulcast). In addition, the transmission can be a unicast transmission. Moreover, a multicast broadcast single frequency network (MBSFN) transmission can be employed. Further, a combination of unicast, SFN and/or MBSFN transmissions can be utilized. For example, unicast transmissions can be combined or multiplexed with SFN transmissions within a same transmission time interval. In other words, communications apparatus 200 enables unicast transmission and SFN transmission to be time division multiplexed. It is to be appreciated that additional transmission modes beyond those mentioned above can be utilized with aspects of the subject disclosure.

Communications apparatus 200 can include a prefix selector 204 that determines a cyclic prefix for a transmission. Many modulation types, such as OFDM, can utilize a cyclic prefix in link construction. Pursuant to an illustration, the cyclic prefix facilitates improved reception of a transmission under multi-path channel conditions. Multi-path is a propagation effect in wireless communications that results in a radio signal arriving at antennas by two or more paths. Atmospheric ducting, reflection and/or refraction in the ionosphere, or reflection from buildings or mountains can create multi-path channel conditions. The cyclic prefix can enable a multi-path to settle prior to reception of actual transmission data. Typically, receiver systems decode a signal after it settles to allow frequencies to achieve orthogonality. According to an aspect, the cyclic prefix can be a repeated portion of an OFDM or other mode symbol. For example, an end portion of a symbol can be repeated at the beginning of the symbol. In an embodiment, the length of the cyclic prefix is equal to the guard interval or period.

Typically, the duration of the cyclic prefix should exceed the largest delay experienced in a multi-path channel. Accordingly, a variety of cyclic prefix lengths can be employed. The cyclic prefix can be a short cyclic prefix (e.g., a duration of 4.7 microseconds), a long cyclic prefix (e.g., 16.66 microseconds), or a longer cyclic prefix (e.g., a duration of a 33.33 microseconds). The longer cyclic prefix (e.g., 33.33 microseconds) can be beneficial in SFN scenarios with extensive use of repeaters. Numerology for the longer cyclic prefix can be constructed by reducing tone spacing to 7.5 KHz.

Communications apparatus 200 further includes a multiplexer 206 that can combine or multiplex two or more transmissions of differing types or modes. In an illustrative instance, multiplexer 206 can multiplex point-to-point (e.g., unicast) transmissions with SFN or MBSFN transmissions. To minimize cyclic prefix insertion loss for unicast transmissions, unicast and SFN transmission employing a longer cyclic prefix should be time division multiplexed. In other words, certain slots are dedicated for longer cyclic prefix SFN transmissions. However, to facilitate efficiency within RAN1, unicast reference symbols and longer cyclic prefix SFN multicast transmission should be multiplexed within the same transmission time interval. In an embodiment, multiplexer 206 alters resource allocation for slots containing longer cyclic prefix SFN transmissions and unicast transmissions. Pursuant to an illustration, the unicast reference symbols are transmitted in the first and third symbols of a slot. In addition, the frequency or tones allocated to the unicast reference symbols are staggered between the first and third symbols (e.g., different frequencies are utilized in the third symbol than in the first symbol). Typically, unicast reference symbols occupy every sixth tone. In accordance with an aspect of the subject disclosure, multiplexer 206 structures the resource such that unicast reference symbols occupy every twelfth tone in the first and third symbols. The additional spread in the allocation maintains a critical sampling of the unicast channel to facilitate accurate channel estimation for delay spreads up to 11 microseconds. In addition, by reducing the number of occupied tones, the overhead of the unicast reference symbols in the frequency domain is also reduced. However, the critical sampling is preserved due to the smaller tone spacing of 7.5 KHz. The above metrics are presented for illustrative purposes and not limitation. It is to be appreciated that other symbol spacing, frequencies spacing and staggering of unicast reference symbols can be employed.

Moreover, although not shown, it is to be appreciated that communications apparatus 200 may include memory that retains instructions with respect to receiving data packet transmissions, combining data packet transmissions, decoding data transmissions, sending acknowledgment messages, and the like. Further the memory can retain previously received data packets for combination prior to decoding. Further, communications apparatus 200 may include a processor that may be utilized in connection with executing instructions (e.g., instructions retained within memory, instructions obtained from a disparate source, . . . ).

Figure 3:
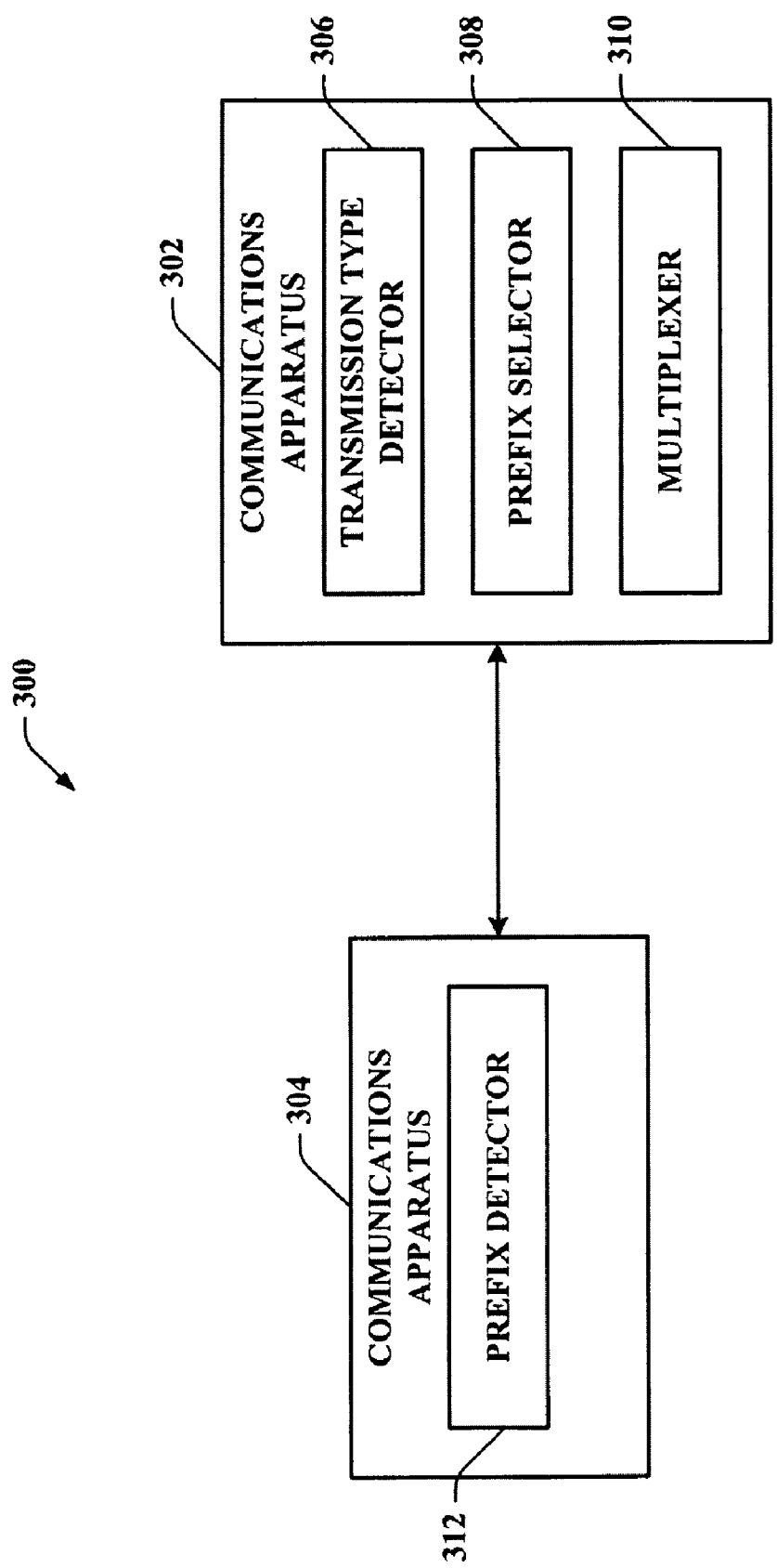
FIG. 3 is an illustration of a wireless communications system according to an aspect of the subject disclosure.

Turning now to FIG. 3, illustrated is a wireless communications system 300 that effectuates employment of multiplexed unicast and multicast transmissions. System 300 includes communications apparatus 302 and 304. Communications apparatus 302 and/or 304 can be a base station or a portion thereof. In addition, communications apparatus 302 and/or 304 can be a mobile device or a portion thereof. Pursuant to an illustration, system 300 can be utilized in wireless communications between one or more base stations, one or more mobile devices (e.g., ad-hoc), or between base stations and mobile devices.

System 300 includes communications apparatus 302 that communications with communications apparatus 304 (and/or any number of disparate apparatus (not shown)). Communications apparatus 302 can transmit data to apparatus 304 over a forward link channel; further communications apparatus 302 can receive data from apparatus 304 over a reverse link channel. The forward link and reverse link channels can include point-to-point transmission modes (e.g., unicast), point-to-multipoint transmission modes (e.g., multicast) and/or broadcast transmission modes. Moreover, system 300 can be a multiple-input, multiple-output (MIMO) system.

Communications apparatus 302 includes a transmission type detector 306, a prefix selector 308 and a multiplexer 310. The transmission type detector 306 can determine the type or mode of transmission to be employed in a transmission to apparatus 304. For example, the transmission can be a unicast transmission, a SFN transmission, a MBSFN transmission and/or a broadcast. The prefix selector 308 can determine a cyclic prefix for a transmission. In an illustrated instance, the cyclic prefix can be short, long or longer. A short cyclic prefix can be 4.7 microseconds in duration, a long can be 16.66 microseconds in duration and a longer or very long cyclic prefix can be 33.33 microseconds in duration. The determination can be based upon channel conditions, desired overhead thresholds, transmission mode, etc.

Multiplexer 310 multiplexes symbols prior to transmission to apparatus 304. Multiplexer 310 can multiplex unicast reference symbols and SFN transmission employing a longer cyclic prefix within the same transmission time interval. In an illustrative instance, slots containing longer cyclic prefix SFN transmissions and unicast transmissions can be structured by multiplexer 310 such that unicast reference symbols are sent in first and third symbols of the slot. In addition, the frequencies allocations for the unicast reference symbols can be staggered between the first and third symbols. Moreover, the unicast reference symbols can occupy every twelfth tone in the first and third symbols. Since the tone spacing is 7.5 KHz, the additional space between occupied tones reduces overhead without affecting critical sampling of the unicast channel. For slots that do not contain longer cyclic prefix SFN transmissions, conventional techniques can be utilized.

Communications apparatus 304 can include a prefix detector 312 that determines the cyclic prefix duration employed by communications apparatus 302 in a transmission or portion thereof. Pursuant to an illustration, communications apparatus 304 can be a mobile device. Typically, a mobile device detects the cyclic prefix duration during an initial cell search procedure. Conventionally, the mobile devices had two hypotheses: short cyclic prefix and long cyclic prefix. However, with the introduction of a longer cyclic prefix (e.g., 33.33 microseconds), a third hypothesis emerges. In a transmission employing longer cyclic prefix numerology, there are three symbols per slot. In a time division multiplexed (TDM) structure for primary synchronization codes (PSC) and secondary synchronization codes (SSC) are transmitted on two separate symbols within in a slot. Thus, only one symbol per slot remains for common control channel (CCCH) or primary broadcast channel (BCH) transmission. Accordingly, in an embodiment, the longer cyclic prefix numerology is not employed in slots containing PSC and/or SSC transmissions.

Referring now to FIGS. 4-10, exemplary resource mappings are depicted in accordance with an aspect of the subject disclosure. For the purposes of simplicity of explanation, the examples illustrate a resource block in the time and frequency dimensions that is equal in duration to one sub-frame or two slots of a transmission (e.g., 1 millisecond). Each block in the along the frequency axis represents a tone wherein the spacing between tones is dependent upon the cyclic prefix duration utilized. Each block along the time axis represents a symbol wherein the duration and number of symbols is also depends upon the cyclic prefix employed. It is to be appreciated that FIGS. 4-10 are for illustrative purposes and the disclosed subject matter is not limited to the scope of these examples. Those skilled in the art should appreciate how the resource mappings can be extended to systems including different number of antennas, varying tone spacing, sub-frame duration, etc.

Figure 4:
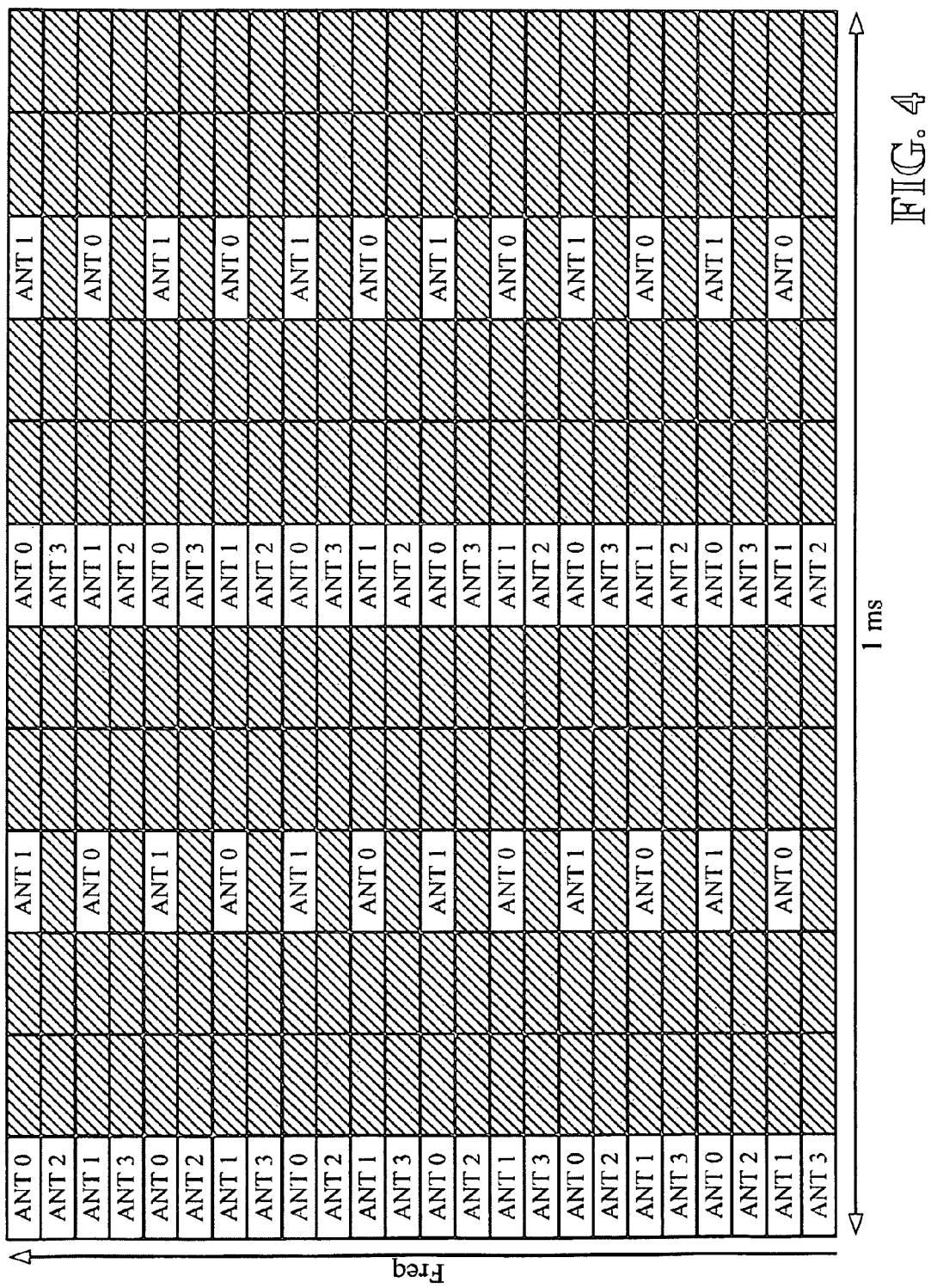
FIGS. 4-10 are illustrations of an example resource mappings in accordance with an aspect of the subject disclosure.
Figure 5:
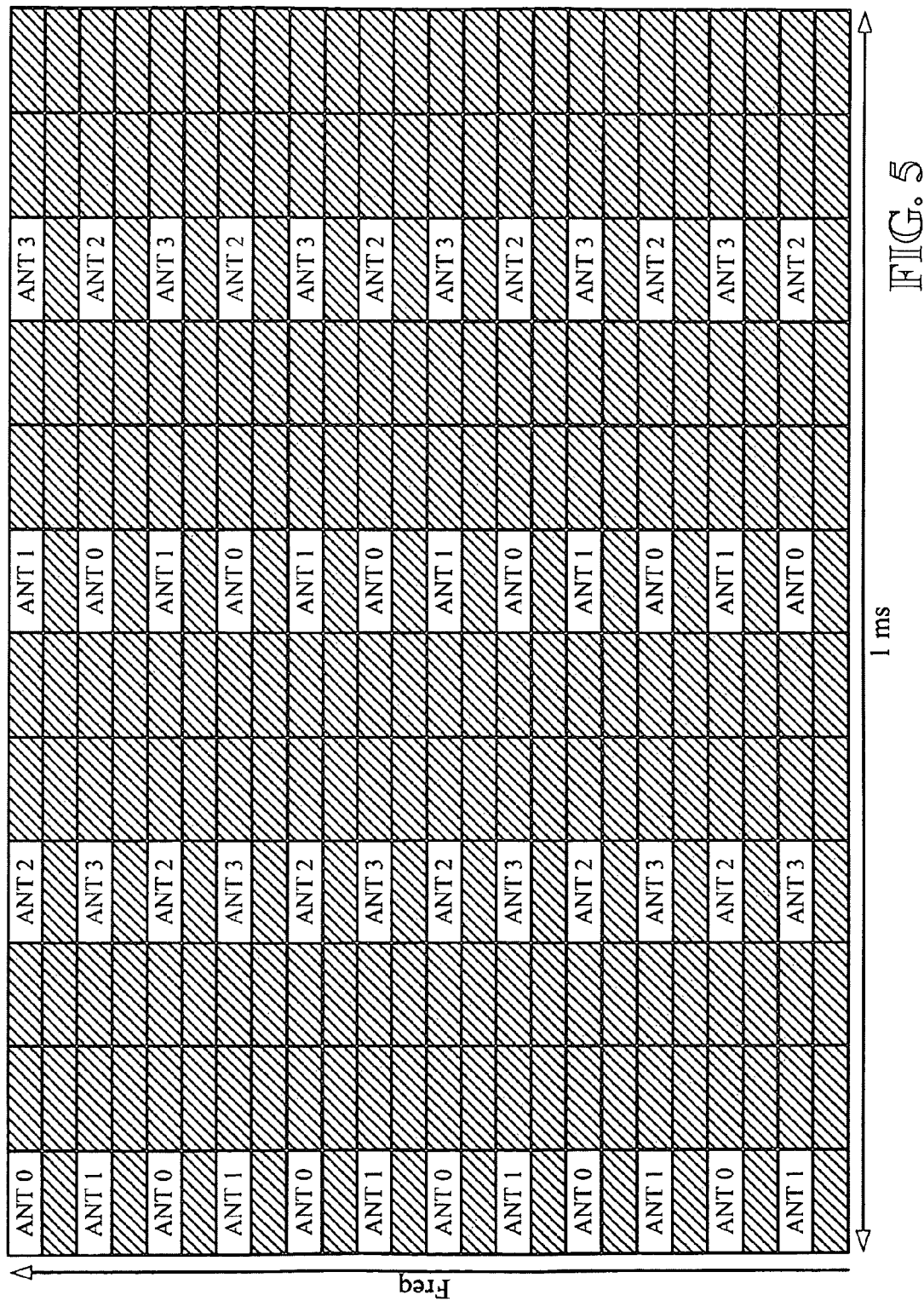

In an embodiment, conventional reference symbol structure is identical for both long cyclic prefix duration (e.g., 16.66 microseconds) and short cyclic prefix duration (e.g., 4.7 microseconds. Utilizing the conventional structure, channel estimation performed by any mobile device can suffer from aliasing if the delay spread (e.g., time difference between a first multipath component and a last multipath component) is greater than 13 microseconds. Even with long cyclic prefix duration or longer cyclic prefix duration, the numerology cannot be employed if the unicast delay spread exceeds a threshold. FIGS. 4 and 5 depict two unicast pilot structures employed with long cyclic prefix duration transmissions that facilitate avoiding the mismatch between prefix duration and channel estimation accuracy.

In FIG. 4, one sub-frame (two slots) containing unicast pilot symbols is illustrated. Under a long cyclic prefix duration, each slot contains six symbols. The depicted structure provides efficient operation in high Doppler scenarios. Pilot symbols are transmitted on the first and fourth symbols of the first slot as well as the first and fourth symbols of the second slot. In the fourth symbols of both slots, not all resources are mapped to antennas. In addition, the mappings are shifted to provide diversity. FIG. 5 depicts another pilot pattern that provides lower overhead. This structure illustrates pilot symbols occupying every other tone in the first and fourth symbols of the both slots. This structure reduces the overhead by one half. Similar to the pattern depicted in FIG. 4, the mappings are shifted to provide diversity.

Figure 6:
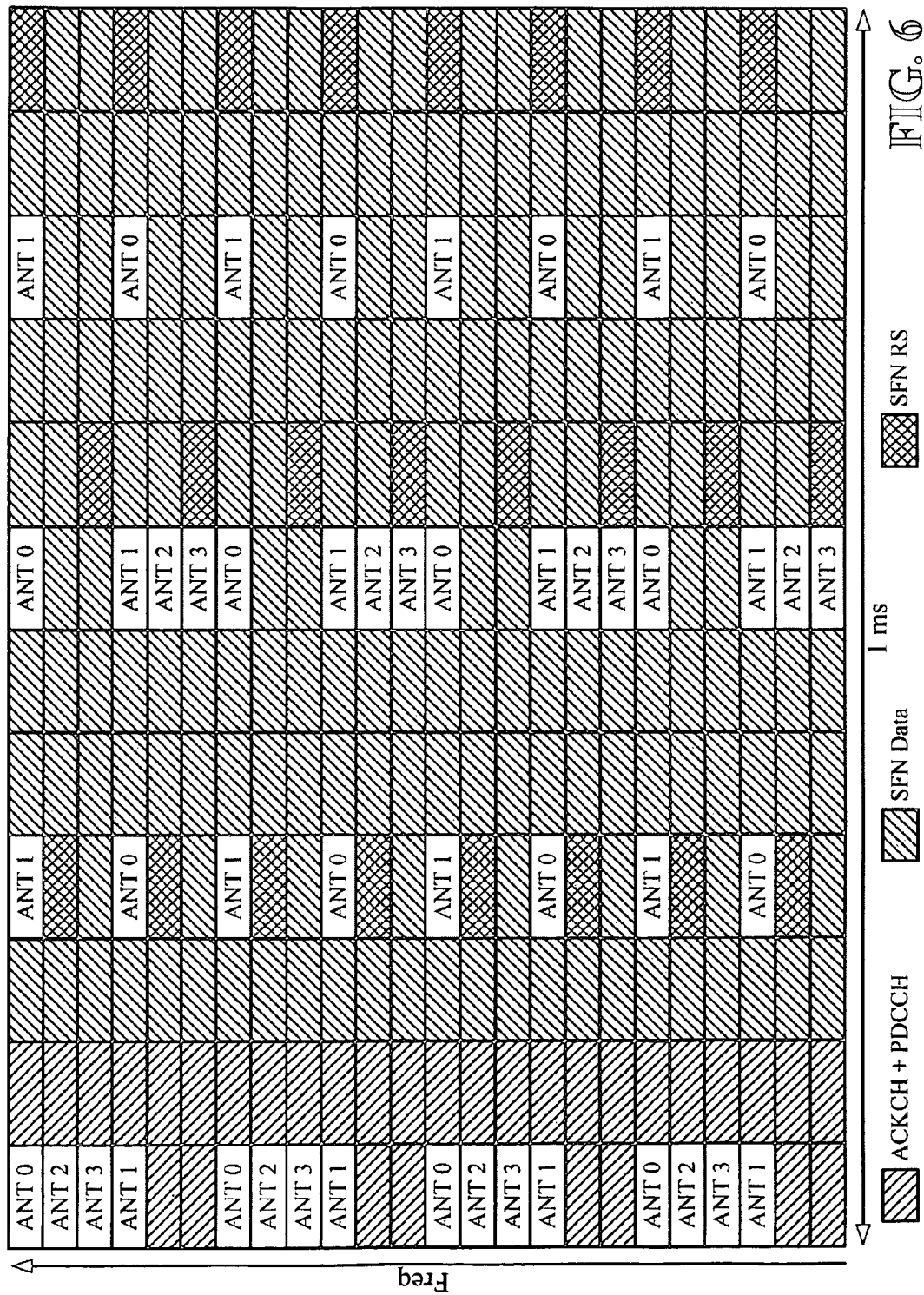
Figure 7:
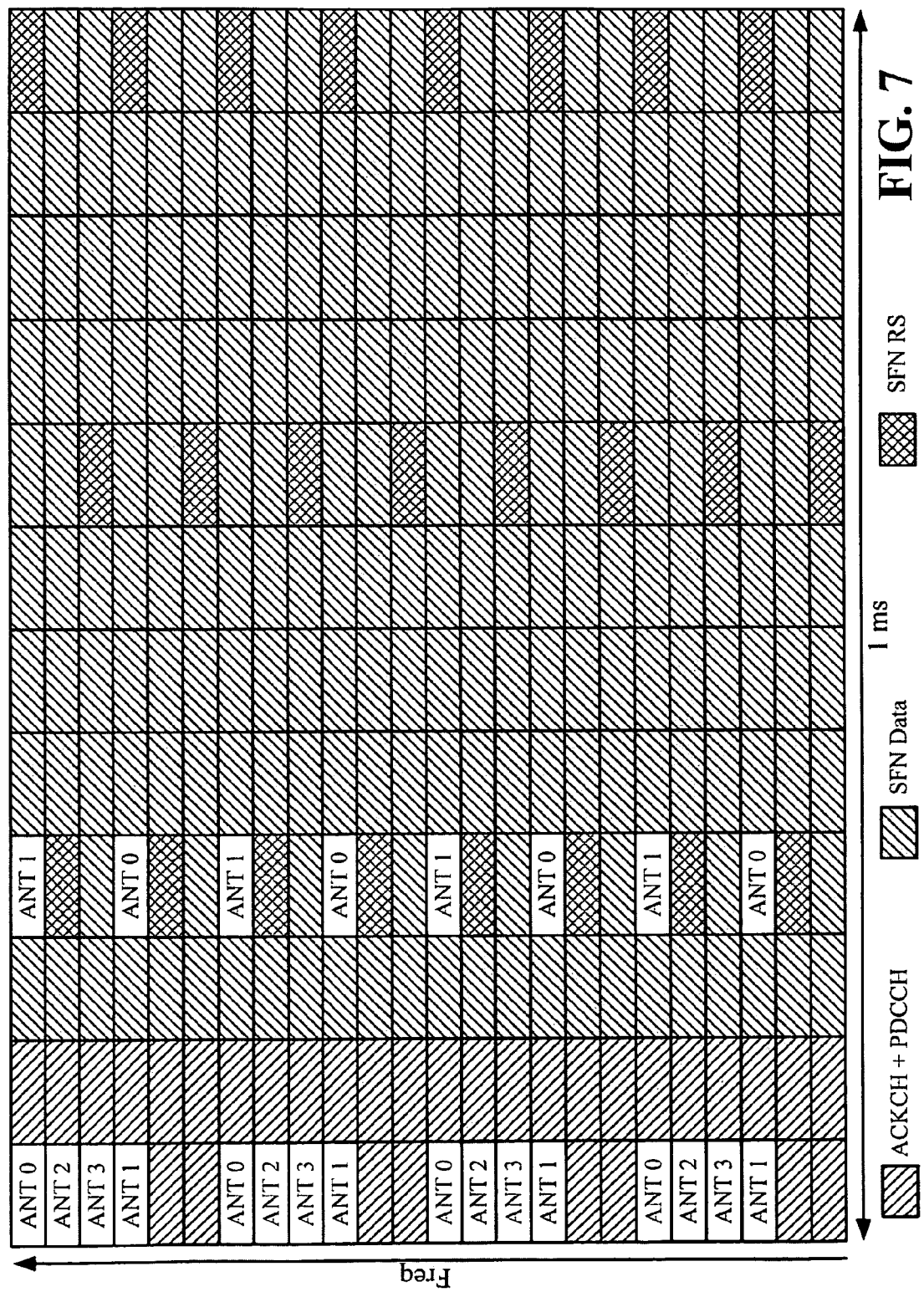

FIGS. 6 and 7 depict multiplexed unicast and MBSFN transmissions in accordance with an aspect of the subject disclosure. In an illustrative instance, the depicted examples involve unicast transmissions on the acknowledgment channel (ACKCH) and the physical downlink control channel (PDCCH). No unicast data is transmitted. In an embodiment, the ACKCH and PDCCH transmission span two OFDM symbols. FIG. 6 depicts multiplexed transmissions based upon a pilot pattern similar to that depicted in FIG. 4 whereas FIG. 7 depicts multiplexed transmission based upon a pilot pattern similar to that illustrated in FIG. 5.

In the illustrated multiplexed resource blocks, unicast reference symbols are shown mapped to particular antennas. In this exemplary scenario, a 4 antenna MIMO system is provided. In addition to the unicast reference symbols, unicast ACKCH and PDCCH transmissions are sent in the first two symbols of the sub-frame. Moreover, SFN data and SFN reference symbols are also sent on symbols within the depicted sub-frame. In FIG. 6, the unicast reference symbol structure is not altered; however overhead remains large. In FIG. 7, unicast reference symbols are not sent in the second slot of the sub-frame. Absent unicast data, the multiplexed structures in FIGS. 6 and 7 facilitate reducing overhead. Channel quality indicator (CQI) accuracy is impacted as well as any coherent demodulation in sub-frames subsequent to the illustrated example.

Figure 9:
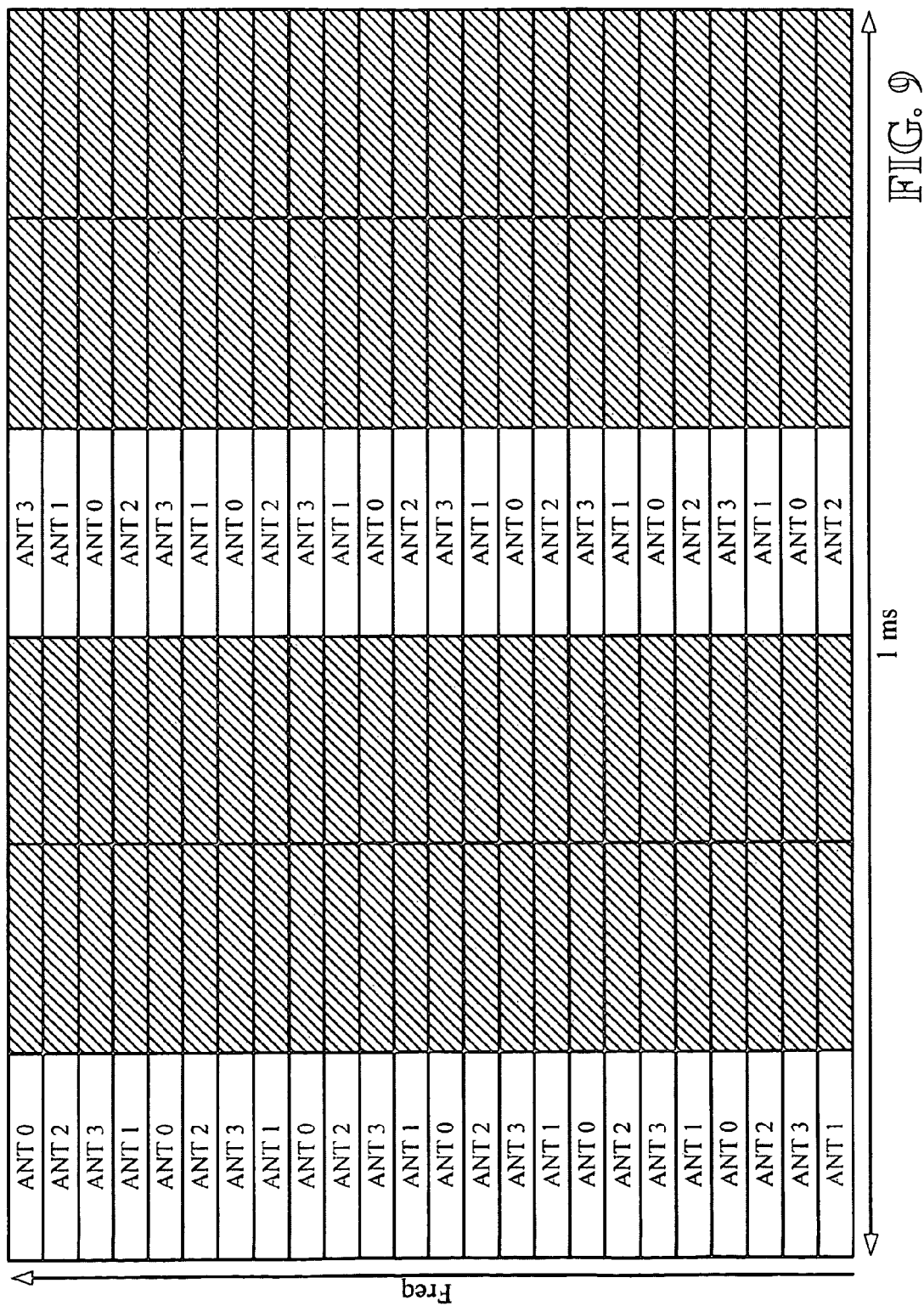
Figure 10:
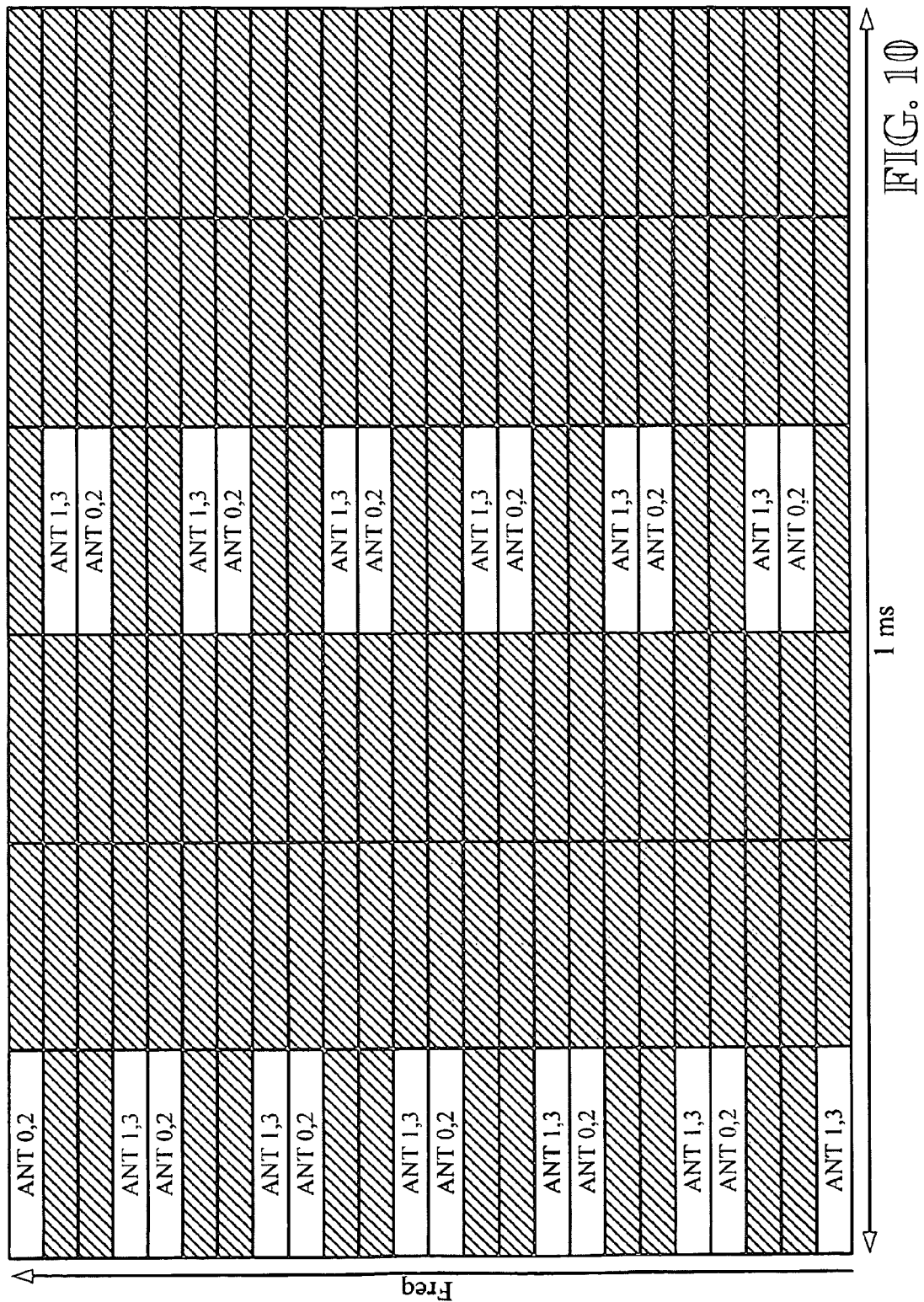

Turning now to FIGS. 9 and 10, illustrated are unicast reference symbol patterns for a unicast pilot structure that employs a longer cyclic prefix duration. For example, the longer cyclic prefix duration can be 33.33 microseconds and constructed from reducing a tone spacing from 15 KHz to 7.5 KHz. Under the longer cyclic prefix duration, each slot contains 3 symbols as opposed to six. Accordingly, a 1 millisecond sub-frame contains 6 symbols instead of 12. The pattern depicted in FIG. 9 can be employed with 4-stream MIMO systems. The pattern illustrated in FIG. 10 provides lower overhead in systems employing 2-stream MIMO with cyclic delay diversity (CDD) from other physical antennas, if available.

Figure 8:
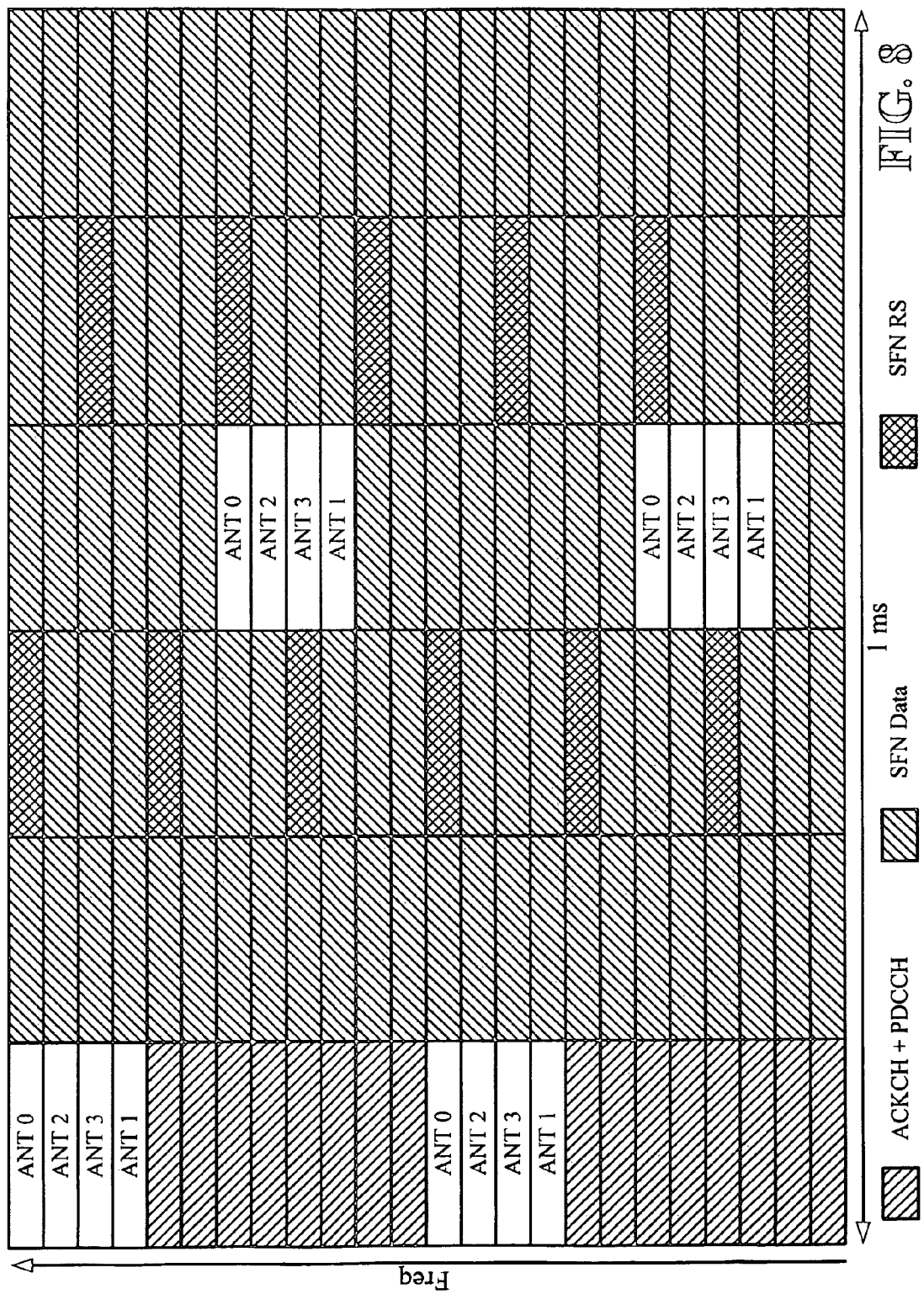

Referring now to FIG. 8, illustrated is unicast reference symbol pattern for a unicast transmission multiplexed with a longer cyclic prefix SFN transmission in accordance with an aspect of the subject disclosure. Similar to FIGS. 6 and 7, the exemplary sub-frame illustrated in FIG. 8 contains unicast reference symbols, SFN reference symbols, unicast ACKCH and PDCCH transmission and SFN data. In slots containing longer cyclic prefix SFN transmissions and unicast transmission, the tone spacing is 7.5 KHz resulting and each slot contains 3 symbols. The unicast reference symbols are sent in the first symbol of the slot. In addition, the frequency is staggered between the reference symbols in the first symbol of the first slot and the first symbol of the second slot of the 1 millisecond sub-frame. While the staggering is depicted as six tones in magnitude, it is to be appreciated that other stagger amounts can be utilized. Moreover, the unicast reference symbols occupy every twelfth tone of the first symbol of each slot. For example, antenna 1 can be mapped to a reference symbol at a particular tone. The next mapping of antenna 1 is twelve tones higher or lower than the particular tone. Spreading reference symbols to every twelfth tone maintains critical sampling of the unicast channel for delay spreads approaching eleven microsecond while also reducing overhead in the frequency domain. For slots not containing longer cyclic frequency SFN transmissions, the tone spacing can be 15 KHz and a nominal structure such as that illustrated in FIGS. 6 and 7 can be employed.

Figure 11:
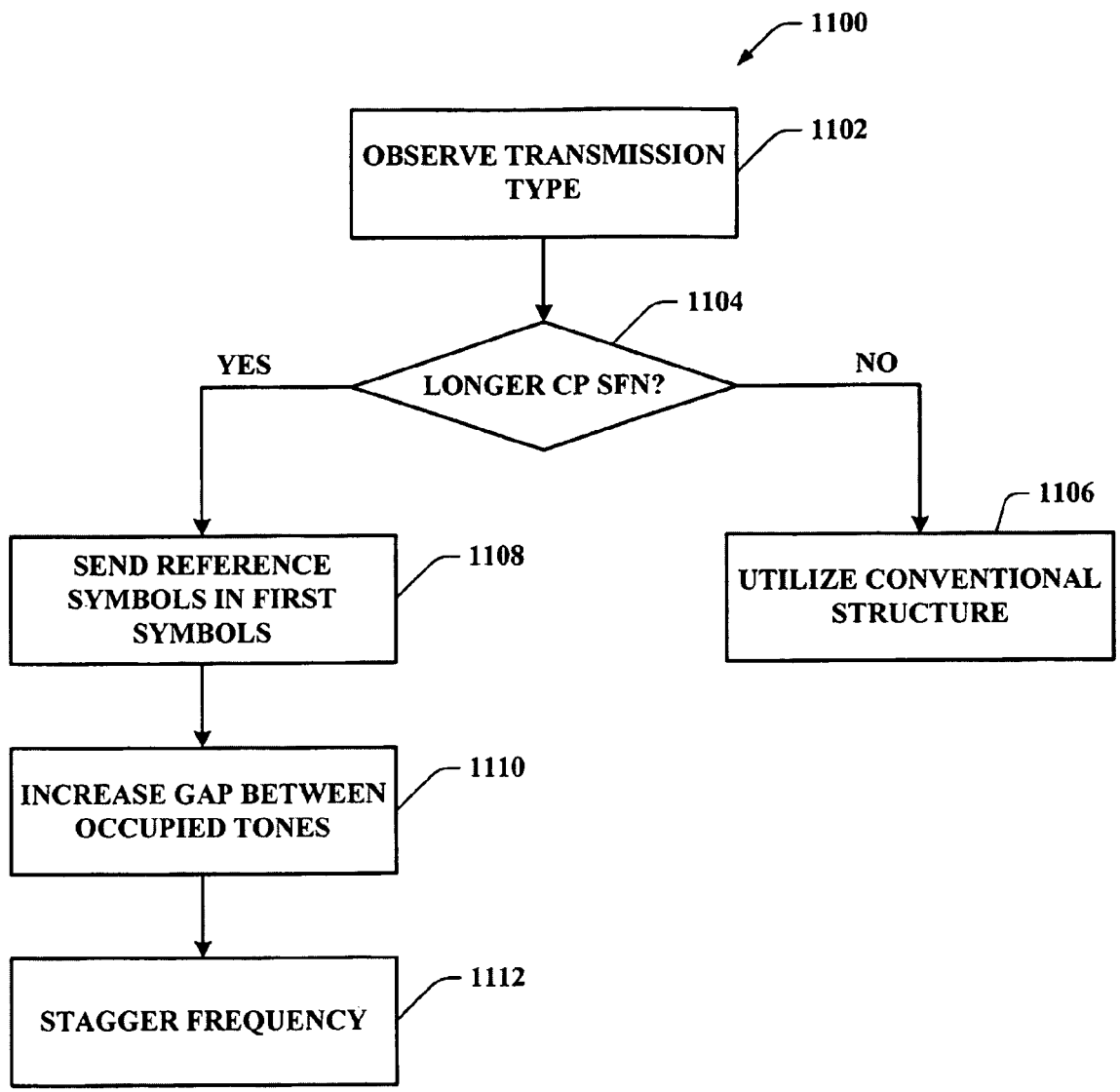
FIG. 11 is an illustration of an example methodology that facilitates providing a pilot structure in multiplexed unicast and multicast transmissions with longer cyclic prefix durations in accordance with an aspect of the subject disclosure.

Referring to FIG. 11, illustrated is a methodology relating to facilitating multiplexing unicast and SFN transmission while preserving unicast pilot structure with sufficient critical sampling properties. While, for purposes of simplicity of explanation, the methodology is shown and described as a series of acts, it is to be understood and appreciated that the methodology is not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning now to FIG. 11, illustrated is a methodology 1100 that facilitates providing a pilot structure in multiplexed unicast transmission with SFN transmissions with longer cyclic prefix durations. Method 1100 can be employed, among other things, to construct a pilot pattern in a multiplexed situation that offers sufficient critical sampling for channel estimation while reducing overhead. In an embodiment, method 1100 can be implemented on a mobile device and/or a base station in a wireless communications system. At reference numeral 1102, a transmission type is observed. The transmission can be a unicast transmission, a SFN transmission, a MBSFN transmission, a broadcast transmission, etc. Moreover, the transmission can be any combination thereof. In addition, the transmission can include varying cyclic prefix lengths. For example, the cyclic prefix duration can be short (e.g., 4.7 microseconds), long (16.66 microseconds) or longer (33.33 microseconds). At reference numeral 1104, a determination is made as to whether the transmission includes slots with SFN transmission employing longer or longer cyclic prefix duration. If No, method 1100 proceeds to reference numeral 1106 where conventional reference symbol structure is utilized. If a longer cyclic prefix SFN transmission is present, the method 1100 proceeds to reference numeral 1108. At 1108, a structure is created where unicast reference symbols are sent in the symbol of the slot. At reference numeral 1110, the gap between tones occupied by unicast reference symbols of the first symbol of the slot is increased. For example, the reference symbols can be spaced to occupy every twelfth tone in of the first symbol in longer cyclic prefix transmissions as opposed to every sixth tone typically utilized in long and/or short cyclic prefix transmissions. At reference numeral 1112, the frequency is staggered between the first symbol of one slot containing unicast reference symbols and the first symbol of a subsequent slot containing unicast reference symbols. When both slots are within the same sub-frame, the frequency is staggered between the first and fourth symbols of the sub-frame.

It will be appreciated that, in accordance with one or more aspects described herein, inferences can be made regarding which transmission mode is employed, which cyclic prefix duration is utilized, whether a special multiplexed pattern should be employed, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to determining the mode of transmission. By way of further illustration, an inference may be made related to determining whether a slot contains longer cyclic prefix SFN transmissions and unicast transmission, whether a high doppler structure should be employed, whether overhead reduction should be the primary goal etc. It will be appreciated that the foregoing examples are illustrative in nature and are not intended to limit the number of inferences that can be made or the manner in which such inferences are made in conjunction with the various embodiments and/or methods described herein.

Figure 12:
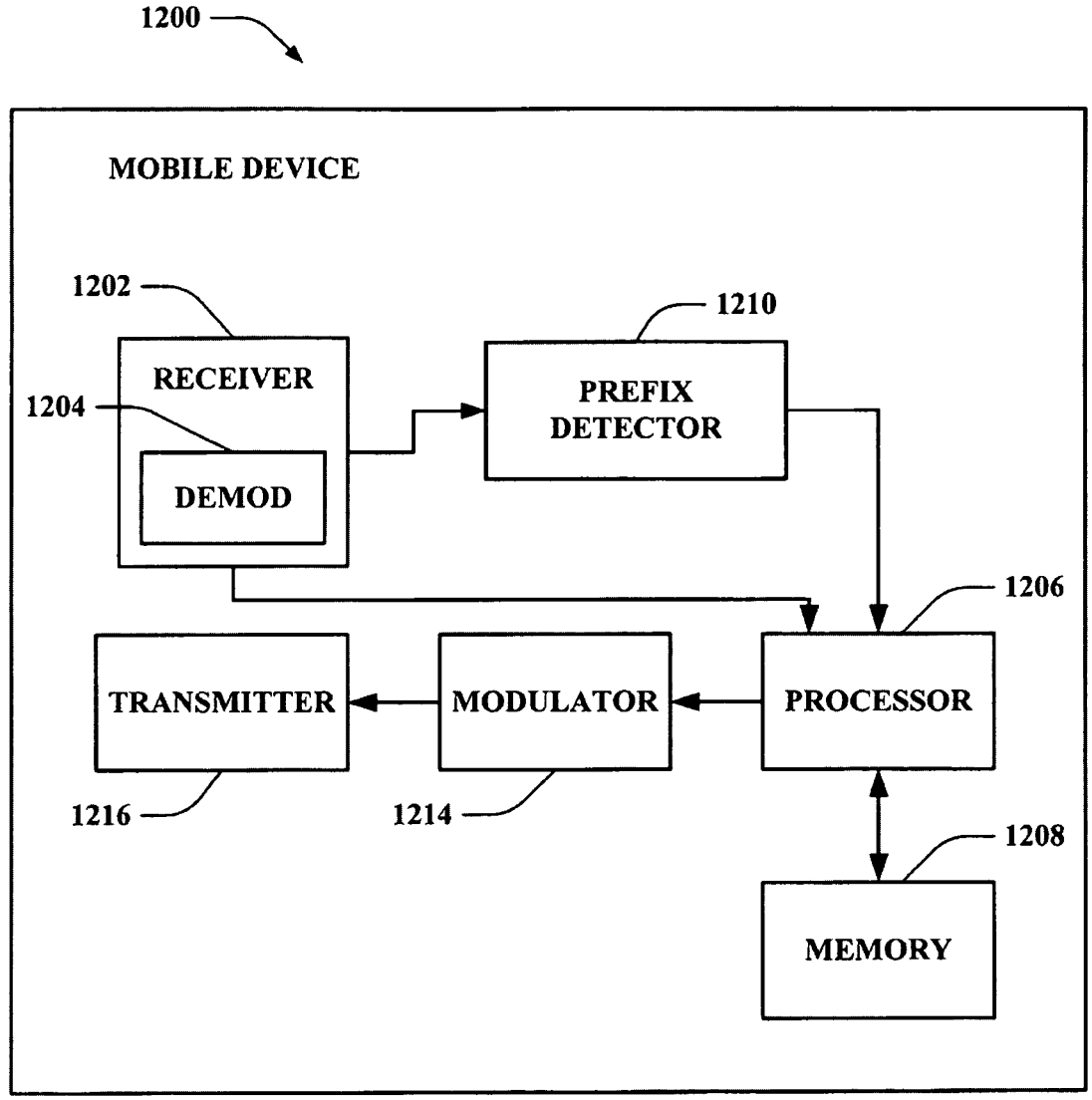
FIG. 12 is an illustration of an example mobile device that facilitates employing a pilot structure in mixed mode transmissions.

FIG. 12 is an illustration of a mobile device 1200 that facilitates employing transmission containing multiplexed unicast and SFN transmission with longer cyclic prefix durations. Mobile device 1200 comprises a receiver 1202 that receives a signal from, for instance, a receive antenna (not shown), and performs typical actions thereon (e.g., filters, amplifies, downconverts, etc.) the received signal and digitizes the conditioned signal to obtain samples. Receiver 1202 can be, for example, an MMSE receiver, and can comprise a demodulator 1204 that can demodulate received symbols and provide them to a processor 1206 for channel estimation and the like. Processor 1206 can be a processor dedicated to analyzing information received by receiver 1202 and/or generating information for transmission by a transmitter 1216, a processor that controls one or more components of mobile device 1200, and/or a processor that both analyzes information received by receiver 1202, generates information for transmission by transmitter 1216, and controls one or more components of mobile device 1200.

Mobile device 1200 can additionally comprise memory 1208 that is operatively coupled to processor 1206 and that may store data to be transmitted, received data, information related to available channels, data associated with analyzed signal and/or interference strength, information related to an assigned channel, power, rate, or the like, and any other suitable information for estimating a channel and communicating via the channel. Memory 1208 can additionally store protocols and/or algorithms associated with estimating and/or utilizing a channel (e.g., performance based, capacity based, etc.).

It will be appreciated that the data store (e.g., memory 1208) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1208 of the subject systems and methods is intended to comprise, without being limited to, these and any other suitable types of memory.

Processor 1202 is further operatively coupled to a prefix detector 1210 that determines the cyclic prefix duration employed by communications apparatus 302 in a transmission or portion thereof. Pursuant to an illustration, communications apparatus 304 can be a mobile device. Typically, a mobile device detects the cyclic prefix duration during an initial cell search procedure. Conventionally, the mobile devices had two hypotheses: short cyclic prefix and long cyclic prefix. However, with the introduction of a longer cyclic prefix (e.g., 33.33 microseconds), a third hypothesis emerges. In a transmission employing longer cyclic prefix numerology, there are three symbols per slot. After detecting the employed cyclic prefix numerology, the transmission can be decoded and the reference symbols utilized for unicast channel estimation. Mobile device 1200 still further comprises a modulator 1214 and a transmitter 1216 that transmits a signal (e.g., acknowledgment message) to, for instance, a base station, another mobile device, etc. Although depicted as being separate from the processor 1206, it is to be appreciated that prefix detector 1210 and/or modulator 1214 may be part of processor 1206 or a number of processors (not shown).

Figure 13:
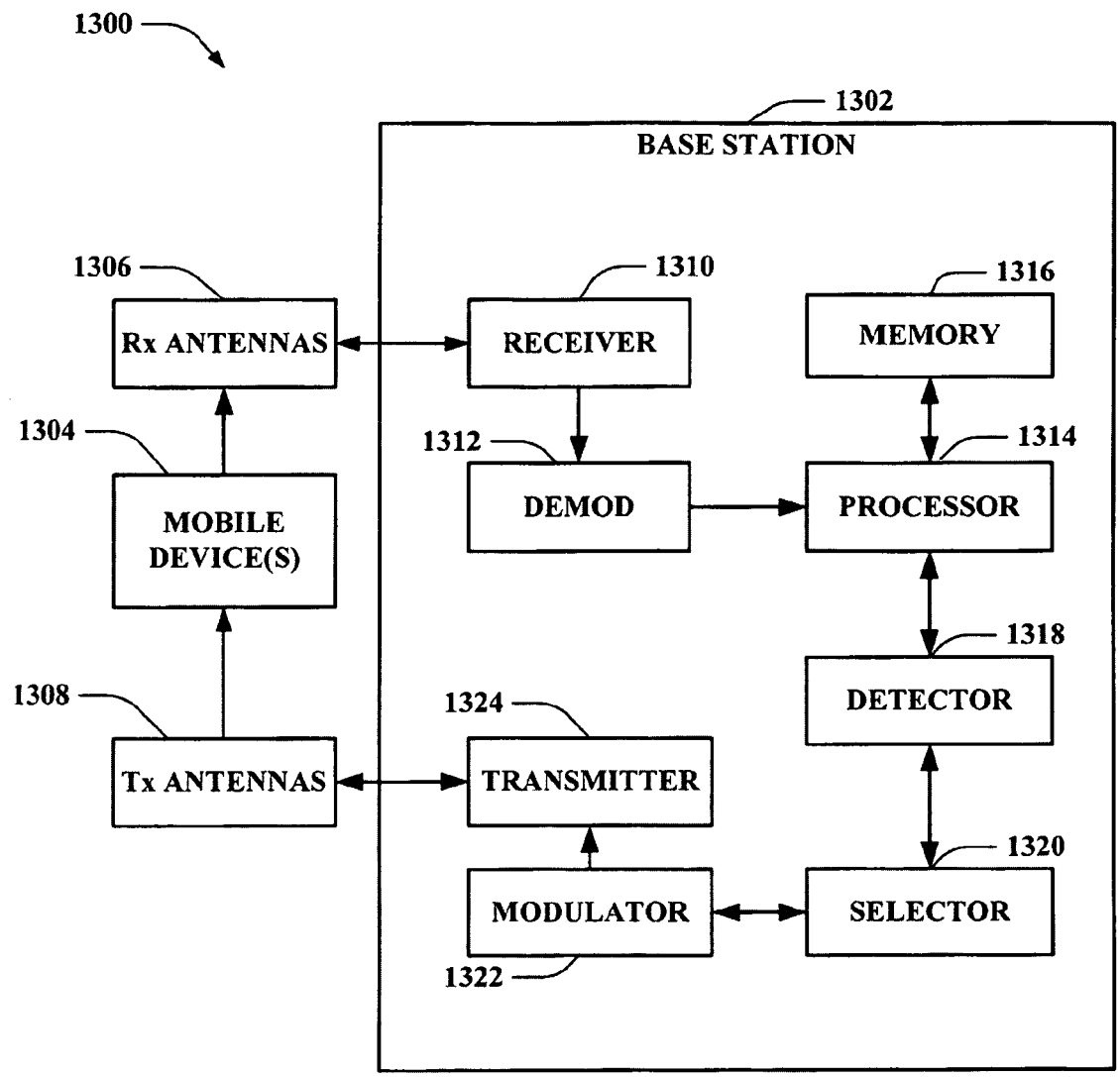
FIG. 13 is an illustration of an example system that facilitates constructing a pilot pattern in accordance with an aspect of the subject disclosure.

FIG. 13 is an illustration of a system 1300 that according to an aspect of the subject disclosure. System 1300 comprises a base station 1302 (e.g., access point, . . . ) with a receiver 1310 that receives signal(s) from one or more mobile devices 1304 through a plurality of receive antennas 1306, and a transmitter 1322 that transmits to the one or more mobile devices 1304 through a plurality of transmit antennas 1308. In an aspect, transmitter 1322 can transmit a data stream to the one or more mobile devices 1304 as a sequence of data packets such that each packet is transmitted in turn until acknowledged. Receiver 1310 can receive information from receive antennas 1306 and is operatively associated with a demodulator 1312 that demodulates received information. Demodulated symbols are analyzed by a processor 1314 that can be similar to the processor described above with regard to FIG. 12, and which is coupled to a memory 1316 that stores information related to estimating a signal (e.g., pilot) strength and/or interference strength, data to be transmitted to or received from mobile device(s) 1304 (or a disparate base station (not shown)), and/or any other suitable information related to performing the various actions and functions set forth herein.

Processor 1314 can be further coupled to a transmission detector 1318 that determines the transmission mode to be employed in a transmission to mobile devices 1304. The transmission mode can be one of a unicast mode, a SFN mode, a MBSFN mode, a broadcast mode or a combination thereof. Base station 1302 can further include a prefix selector 1320 that selects a cyclic prefix duration to employ in the transmission or a portion thereof. For example, varying cyclic prefix durations can be utilized in different sub-frames of a transmission. Information to be transmitted may be provided to a modulator 1322. Modulator 1322 can multiplex the information for transmission by a transmitter 1326 through antenna 1308 to mobile device(s) 1304. processor 1420 applies beamforming weights to the symbols of the data streams and to the antenna from which the symbol is being transmitted.

Each transmitter 1422 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1422a through 1422t are transmitted from $N_T$ antennas 1424a through 1424t, respectively.

At mobile device 1450, the transmitted modulated signals are received by $N_R$ antennas 1452a through 1452r and the received signal from each antenna 1452 is provided to a respective receiver (RCVR) 1454a through 1454r. Each receiver 1454 conditions (e.g., filters, amplifies, and downconverts) a respective signal, digitizes the conditioned signal to provide samples, and further processes the samples to provide a corresponding "received" symbol stream.

An RX data processor 1460 may receive and process the $N_R$ received symbol streams from $N_R$ receivers 1454 based on a particular receiver processing technique to provide $N_T$ "detected" symbol streams. RX data processor 1460 may demodulate, deinterleave, and decode each detected symbol stream to recover the traffic data for the data stream. The processing by RX data processor 1460 is complementary to that performed by TX MIMO processor 1420 and TX data processor 1414 at base station 1410.

A processor 1470 may periodically determine which precoding matrix to utilize as discussed above. Further, processor 1470 may formulate a reverse link message comprising a matrix index portion and a rank value portion.

The reverse link message may comprise various types of information regarding the communication link and/or the received data stream. The reverse link message may be processed by a TX data processor 1438, which also receives traffic data for a number of data streams from a data source 1436, modulated by a modulator 1480, conditioned by transmitters 1454a through 1454r, and transmitted back to base station 1410.

At base station 1410, the modulated signals from mobile device 1450 are received by antennas 1424, conditioned by receivers 1422, demodulated by a demodulator 1440, and processed by a RX data processor 1442 to extract the reverse link message transmitted by mobile device 1450. Further, processor 1430 may process Although depicted as being separate from the processor 1314, it is to be appreciated that demodulator 1312, detector 1318, selector 1320 and/or modulator 1322 may be part of processor 1314 or a number of processors (not shown).

Figure 14:
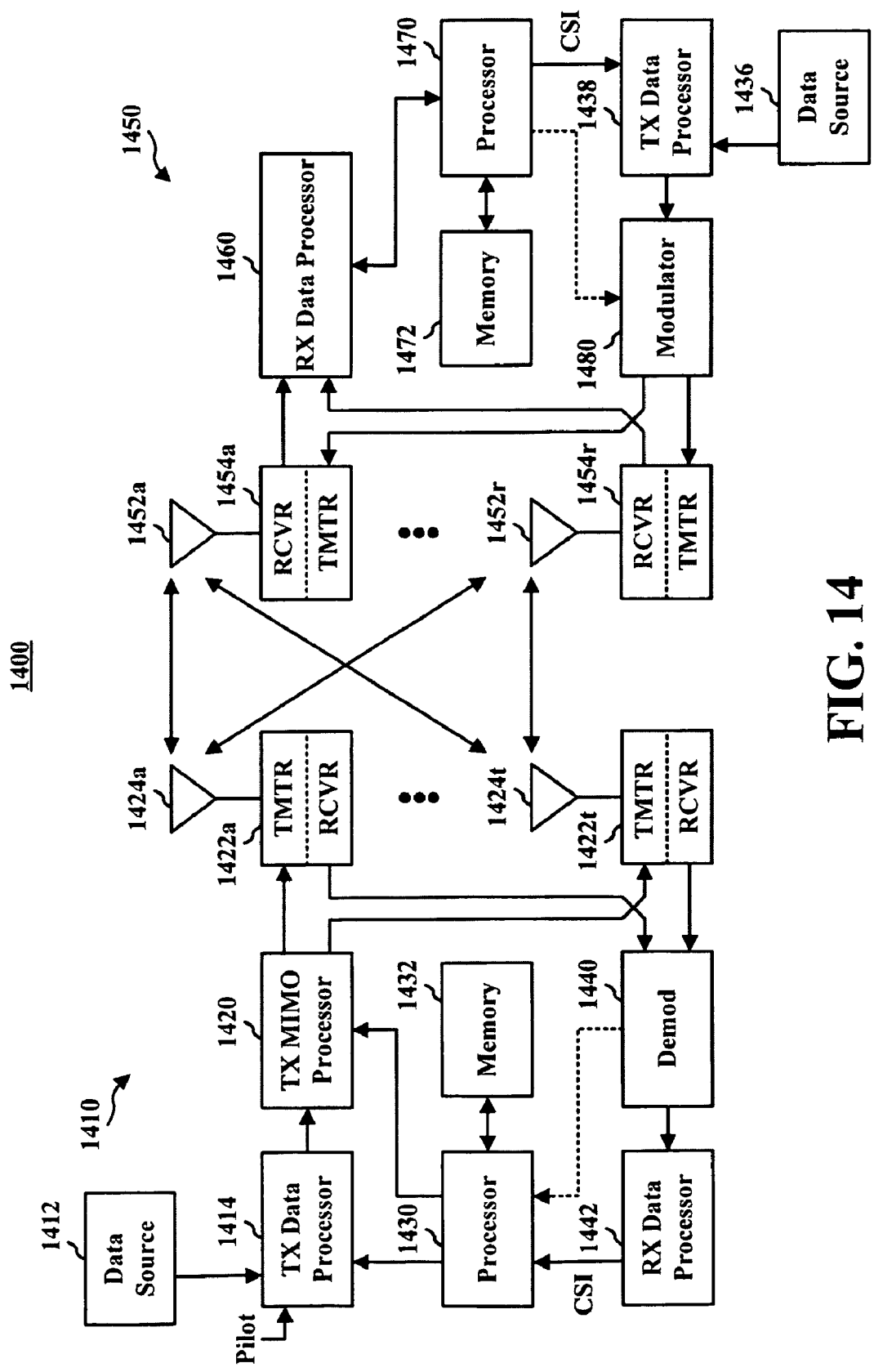
FIG. 14 is an illustration of an example wireless network environment that can be employed in conjunction with the various systems and methods described herein.

FIG. 14 shows an example wireless communication system 1400. The wireless communication system 1400 depicts one base station 1410 and one mobile device 1450 for sake of brevity. However, it is to be appreciated that system 1400 may include more than one base station and/or more than one mobile device, wherein additional base stations and/or mobile devices may be substantially similar or different from example base station 1410 and mobile device 1450 described below. In addition, it is to be appreciated that base station 1410 and/or mobile device 1450 may employ the systems (FIGS. 1-3 and 12-13) and/or methods (FIG. 11) described herein to facilitate wireless communication there between.

At base station 1410, traffic data for a number of data streams is provided from a data source 1412 to a transmit (TX) data processor 1414. According to an example, each data stream may be transmitted over a respective antenna. TX data processor 1414 formats, codes, and interleaves the traffic data stream based on a particular coding scheme selected for that data stream to provide coded data.

The coded data for each data stream may be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and may be used at mobile device 1450 to estimate channel response. The multiplexed pilot and coded data for each data stream may be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream may be determined by instructions performed or provided by processor 1430.

The modulation symbols for the data streams may be provided to a TX MIMO processor 1420, which may further process the modulation symbols (e.g., for OFDM). TX MIMO processor 1420 then provides $N_T$ modulation symbol streams to $N_T$ transmitters (TMTR) 1422a through 1422t. In various embodiments, TX MIMO the extracted message to determine which precoding matrix to use for determining the beamforming weights.

Processors 1430 and 1470 may direct (e.g., control, coordinate, manage, etc.) operation at base station 1410 and mobile device 1450, respectively. Respective processors 1430 and 1470 can be associated with memory 1432 and 1472 that store program codes and data. Processors 1430 and 1470 can also perform computations to derive frequency and impulse response estimates for the uplink and downlink, respectively.

It is to be understood that the embodiments described herein may be implemented in hardware, software, firmware, middleware, microcode, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

Figure 15:
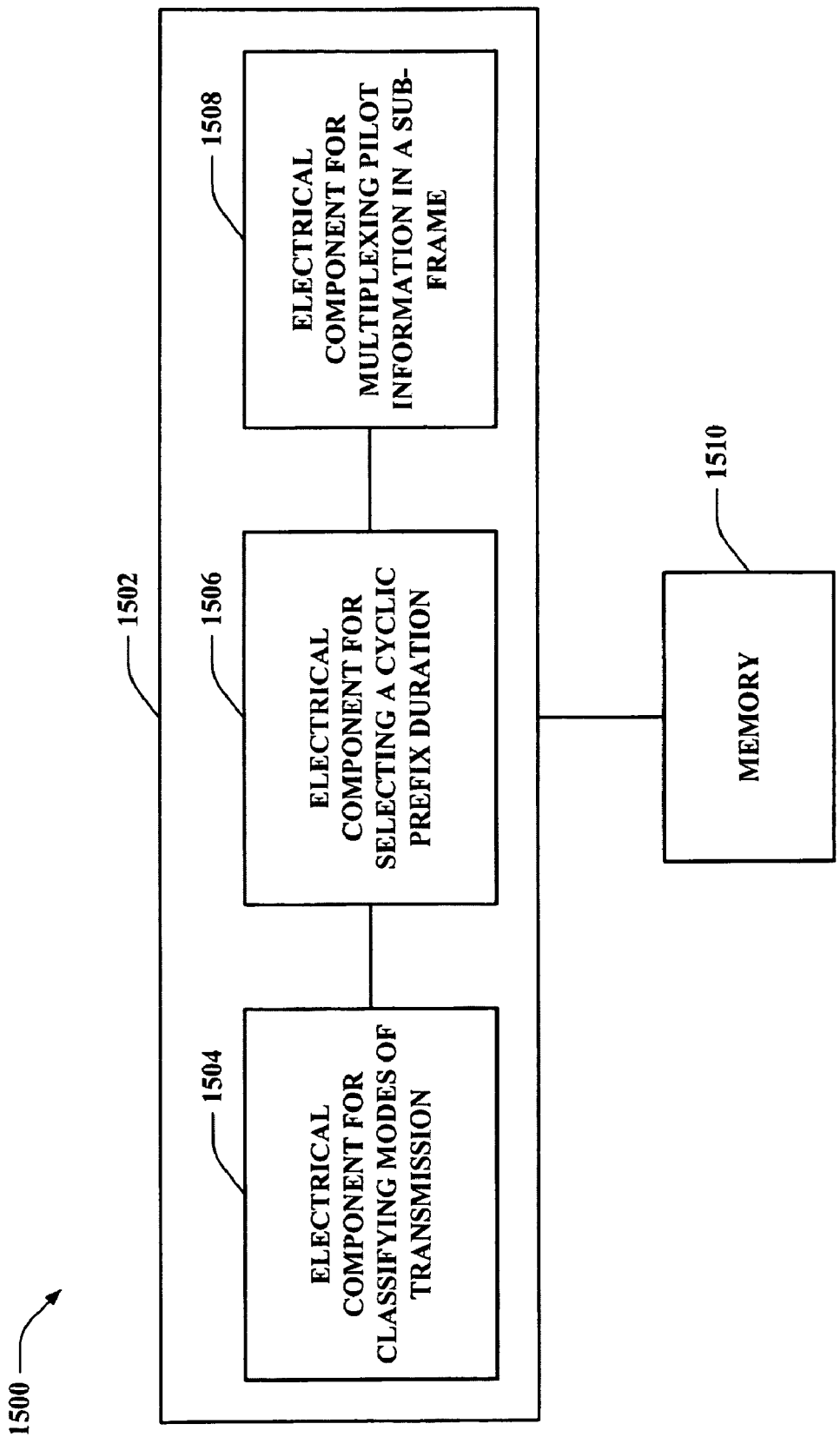
FIG. 15 is an illustration of an example system facilitates constructing a pilot pattern in multiplexed unicast and multicast transmissions.

With reference to FIG. 15, illustrated is a system 1500 that effectuates transmitting pilot signals multiplexed with multicast transmissions. For example, system 1500 may reside at least partially within a mobile device and/or base station. It is to be appreciated that system 1500 is represented as including functional blocks, which may be functional blocks that represent functions implemented by a processor, software, or combination thereof (e.g., firmware). System 1500 includes a logical grouping 1502 of electrical components that can act in conjunction. For instance, logical grouping 1502 may include an electrical component for classifying a mode of transmission 1504. The mode can be a point-to-point transmission (e.g., unicast), a point-to-multipoint (e.g., multicast), a broadcast or a combination thereof. Further, logical grouping 1502 may comprise an electrical component for selecting a cyclic prefix duration 1506. For example, the mode of transmission, channel conditions, or efficiency concerns can influence the cyclic prefix duration utilized. Moreover, logical grouping 1502 can include an electrical component for multiplexing pilot information in a sub-frame 1506. For instance, in a sub-frame contain longer cyclic prefix SFN transmissions, unicast pilot information can be sent in the first and fourth symbols of the sub-frame. In addition, the frequency employed can be staggered between the first and fourth symbols. Additionally, system 1500 may include a memory 1510 that retains instructions for executing functions associated with electrical components 1504, 1506 and 1508. While shown as being external to memory 1510, it is to be understood that one or more of electrical components 1504, 1506 and 1508 may exist within memory 1510.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for transmitting a set of pilot signals with multiplexed unicast and multicast transmissions, comprising:
   classifying one or more modes of transmission;
   selecting a longer cyclic prefix duration for at least one sub-frame in accordance with the classified one or more modes; and
   multiplexing unicast reference symbols, multicast reference symbols and multicast user data in the at least one sub-frame based at least in part on the longer cyclic prefix duration;
   wherein the multiplexing includes one of:
      employing unicast reference symbols in both slots of the at least one sub-frame when the sub-frame does not contain longer cyclic prefix single frequency network transmissions; and
      allocating unicast reference symbols only in the first slot of the at least one sub-frame when the sub-frame contains longer cyclic prefix single frequency network transmissions.

2. The method of claim 1, wherein the modes of transmission include at least one of a unicast transmission, a single frequency network transmission, a multicast transmission, a simulcast transmission and a broadcast transmission.

3. The method of claim 1, wherein the longer duration cyclic prefix is constructed by reducing a tone spacing.

4. The method of claim 1, further comprising precluding the utilization of a longer cyclic prefix in sub-frames that contain synchronization codes.

5. A wireless communication apparatus, comprising:
   a memory that retains instructions related to classifying one or more modes of transmission, selecting a longer cyclic prefix duration for at least one sub-frame in accordance with the classified one or more modes and multiplexing pilot information and multiplex user data in the at least one sub-frame based at least in part on the longer cyclic prefix duration; and
   a processor coupled to the memory, configured to execute the instructions retained in the memory;
   wherein the instructions related to the multiplexing includes one of:
      instructions related to employing unicast reference symbols in both slots of the at least one sub-frame when the sub-frame does not contain longer cyclic prefix single frequency network transmissions; and
      instructions related to allocating unicast reference symbols only in the first slot of the at least one sub-frame when the sub-frame contains longer cyclic prefix single frequency network transmissions.

6. The wireless communication apparatus of claim 5, wherein the modes of transmission include at least one of a unicast transmission, a single frequency network transmission, a multicast transmission, a simulcast transmission and a broadcast transmission.

7. The wireless communication apparatus of claim 5, wherein the memory further retains instructions related to precluding the utilization of a longer duration in sub-frames that contain synchronization codes.

8. A wireless communications apparatus that facilitates transmitting a pilot signal multiplexed with multicast transmissions, comprising:
   means for classifying one or more modes of transmission;
   means for selecting a longer cyclic prefix duration for at least one sub-frame in accordance with the classified one or more modes; and
   means for multiplexing pilot information and user data in the at least one sub-frame based at least in part on the longer cyclic prefix duration;
   wherein the means for multiplexing includes one of:
      means for employing unicast reference symbols in both slots of the at least one sub-frame when the sub-frame does not contain longer cyclic prefix single frequency network transmissions; and
      means for allocating unicast reference symbols only in the first slot of the at least one sub-frame when the sub-frame contains longer cyclic prefix single frequency network transmissions.

9. The wireless communications apparatus of claim 8, wherein the modes of transmission include at least one of a unicast transmission, a single frequency network transmission, a multicast transmission, a simulcast transmission and a broadcast transmission.

10. The wireless communications apparatus of claim 8, further comprising means for precluding the utilization of a longer duration in sub-frames that contain synchronization codes.

11. A non-transitory machine-readable medium having stored thereon machine-executable instructions for:
    classifying one or more modes of transmission;
    selecting a longer prefix duration for at least one sub-frame in accordance with the classified one or more modes; and
    multiplexing pilot information and user data in the at least one sub-frame based at least in part on the longer cyclic prefix duration;
    wherein the multiplexing includes one of:
       employing unicast reference symbols in both slots of the at least one sub-frame when the sub-frame does not contain longer cyclic prefix single frequency network transmissions; and
       allocating unicast reference symbols only in the first slot of the at least one sub-frame when the sub-frame contains longer cyclic prefix single frequency network transmissions.

12. The machine-readable medium of claim 11, wherein the modes of transmission include at least one of a unicast transmission, a single frequency network transmission, a multicast transmission, a simulcast transmission and a broadcast transmission.

13. The machine-readable medium of claim 11, wherein selecting a cyclic prefix duration comprises precluding the utilization of a longer duration in sub-frames that contain synchronization codes.

14. In a wireless communication system, an apparatus comprising:

an integrated circuit comprises a processor and a memory configured to:

classify one or more modes of transmission;

select a longer cyclic prefix duration for at least one sub-frame in accordance with the classified one or more modes; and multiplex pilot information and multicast user data in the at least one sub-frame based at least in part on the longer cyclic prefix duration, wherein the integrated circuit configured to multiplex is further configured to one of:

employ unicast reference symbols in both slots of the at least one sub-frame when the sub-frame does not contain longer cyclic prefix single frequency network transmissions; and allocate unicast reference symbols only in the first slot of the at least one sub-frame when the sub-frame contains longer cyclic prefix single frequency network transmissions.

* * * * *